United States Patent
Sander et al.

(10) Patent No.: US 11,407,525 B2
(45) Date of Patent: Aug. 9, 2022

(54) DRONE DEFENSE SYSTEM

(71) Applicants: Airbus Operations GmbH, Hamburg (DE); HENSOLDT Sensors GmbH, Taufkirchen (DE)

(72) Inventors: Peter Sander, Hamburg (DE); Hubert Piontek, Ulm (DE); Peter Leopold Pirklbauer, Hamburg (DE); Oliver Nuessen, Hamburg (DE); Cosima Eggers, Hamburg (DE); Johannes Petz, Ulm (DE); Daniel Preis, Ulm (DE)

(73) Assignees: Airbus Operations GmbH, Hamburg (DE); Hensoldt Sensors GmbH, Taufkirchen (DE)

( * ) Notice: Subject to any disclaimer, the term of this patent is extended or adjusted under 35 U.S.C. 154(b) by 891 days.

(21) Appl. No.: 15/876,954

(22) Filed: Jan. 22, 2018

(65) Prior Publication Data
US 2018/0208326 A1    Jul. 26, 2018

(30) Foreign Application Priority Data
Jan. 23, 2017  (DE) .......................... 102017201043.6

(51) Int. Cl.
*B64D 45/00* (2006.01)
*H04K 3/00* (2006.01)

(52) U.S. Cl.
CPC ......... *B64D 45/0034* (2019.08); *H04K 3/825* (2013.01); *H04K 3/84* (2013.01); *H04K 3/90* (2013.01); *H04K 3/92* (2013.01); *H04K 2203/22* (2013.01)

(58) Field of Classification Search
CPC ............ B64D 45/0015; B64D 45/0031; B64D 45/0034; H04K 3/90; H04K 3/825; H04K 3/84; H04K 3/92; H04K 2203/22
USPC ......................................................... 244/121
See application file for complete search history.

(56) References Cited

U.S. PATENT DOCUMENTS

| | | | |
|---|---|---|---|
| 2016/0068264 A1* | 3/2016 | Ganesh ................ | G06Q 10/083 701/4 |
| 2017/0148332 A1* | 5/2017 | Ziemba .................... | H04K 3/92 |
| 2017/0192089 A1* | 7/2017 | Parker ..................... | G01S 3/782 |

FOREIGN PATENT DOCUMENTS

| | | | | |
|---|---|---|---|---|
| DE | 102015008256 | | 12/2016 | |
| DE | 102015008256 A1 * | | 12/2016 | ........... B64C 39/024 |
| WO | WO-2006020864 A1 * | | 2/2006 | ............... H04K 3/42 |

OTHER PUBLICATIONS

Sennan Search Report, dated Jan. 26, 2017, priority document.

* cited by examiner

*Primary Examiner* — Tye William Abell
(74) *Attorney, Agent, or Firm* — Greer, Burns & Crain, Ltd.

(57) ABSTRACT

A disruption device for fixing to an aerial vehicle. The disruption device is adapted to disrupt at least one radio path between at least one receiving unit of an unmanned flying body and at least one transmitting unit provided for controlling the flight path of the unmanned flying body. An aerial vehicle having the disruption device is further provided.

15 Claims, 4 Drawing Sheets

DRONE DEFENSE SYSTEM

CROSS-REFERENCES TO RELATED APPLICATIONS

This application claims the benefit of the German patent application No. 10 2017 201 043.6 filed on Jan. 23, 2017, the entire disclosures of which are incorporated herein by way of reference.

BACKGROUND OF THE INVENTION

The invention relates to a disruption device for fixing to an aerial vehicle, and to an aerial vehicle having the disruption device.

There are disruption devices for radio paths between a transmitter and a receiver in the form of jammers and spoofers. In jammers, wide-band signals or short pulses are used to disrupt another signal that is to be suppressed. In spoofers, a signal is generated that disguises the signal to be suppressed by transmission of a similar manipulated signal. The frequency of incidents involving unmanned flying bodies entering the airspace of an aerial vehicle has risen as such technological means have increasingly become available to the public at large and the threat of terrorism has grown. The need to secure the airspace of an aerial vehicle and to prevent the unmanned flying bodies from entering the airspace thereby increases.

SUMMARY OF THE INVENTION

An object of the present invention is to provide a device for preventing collisions between unmanned flying bodies and aerial vehicles.

According to a first aspect, a disruption device for fixing to an aerial vehicle is provided. The disruption device is adapted to disrupt at least one radio path between at least one receiving unit of an unmanned flying body and at least one transmitting unit provided for controlling the flight path of the unmanned flying body.

This has the advantage of preventing other flying objects from entering a flying range of the aerial vehicle. The disruption device further has the advantage that it does not have to be adapted to a specific airport environment, unlike disruption devices on the ground, which must be individually adapted to a particular airport. If the flying object is flying in a border region of the airport, ground-based disruption devices are not able to prevent the flying object from entering an airspace of the aerial vehicle.

The expression "unmanned flying body" can be understood herein as meaning "flying object" or "drone." The expression disruption device can also be understood as meaning "drone defense system" or "drone defense device." An aerial vehicle can in particular be an airplane, a helicopter, an aerostat, an airship or a hot-air balloon.

The disruption device can further be adapted to disrupt, for example simultaneously, radio paths between receiving units of a plurality of unmanned flying bodies and transmitting units provided for controlling the flight path of the plurality of unmanned flying bodies. The following remarks relating to the unmanned flying body can thus refer to one or more unmanned flying bodies.

The disruption device can be adapted for use on an aerial vehicle. The disruption device can be mounted on/arranged on/fixed to a shell of the aerial vehicle. For example, a front region of the aerial vehicle can be used for mounting. For example, mounting, in particular in cross-section, can take place beneath a fuselage of the aerial vehicle.

This has the advantage over ground-based disruption devices of directly repelling an impending attack by another flying object.

The at least one radio path can comprise a first radio path. The at least one receiving unit of the unmanned flying body can comprise a first receiving unit. The at least one transmitting unit can comprise a first transmitting unit. The device can be adapted to disrupt the first radio path between the first receiving unit and the first transmitting unit provided for controlling the flight path of the unmanned flying body.

This has the advantage of interfering with a remote-controlled flying object in such a manner that it either flies back to the starting point, maneuvers back towards the ground, hovers/stops in the air until an associated battery is empty, or falls uncontrollably to the ground.

The at least one radio path can comprise a plurality of second radio paths.

The at least one receiving unit of the unmanned flying body can comprise a second receiving unit. The at least one transmitting unit can comprise a plurality of second transmitting units. The device can be adapted to disrupt the plurality of second radio paths between the second receiving unit and the plurality of second transmitting units provided for controlling the flight path of the unmanned flying body.

This has the advantage, when there are a plurality of radio paths to the flying object, of preventing connection of any kind, in order to influence the flight path of the flying object.

The first transmitting unit can be a remote control. The first radio path can be a wireless connection between the remote control and the first receiving unit.

This has the advantage of suppressing ground-based communication with the flying object via a remote control.

The plurality of second transmitting units can be global navigation satellite system (GNSS) transmitters. The second receiving unit can be a GNSS receiver. The plurality of second radio paths can be wireless connections between the GNSS transmitters and the GNSS receiver.

This has the advantage, in the case of automatic guidance of the flying object that is not under the control of a remote control, of suppressing a navigation provided by a satellite system and rendering the flying object unoriented.

The disruption device can be adapted to transmit information which is usable at a protocol level (of the first transmitting unit and/or plurality of second transmitting units).

This has two advantages. Firstly, the flying object is disrupted more effectively. This means that (a) the required transmitting power at a given range of the disruption device is reduced, or (b) at a given transmitting power, the achieved range is increased. The described effects (a) and (b) are equivalent. In addition, the influence on other users of the frequency spectrum is further reduced. This effect occurs together with effect (a) or (b). Secondly, control over the flying object can be taken over by the disruption device. The flying object can thereby purposively be removed from a danger zone of the aerial vehicle. The take-over of the control of the flying object can be expanded in combination with a detection and tracking device for flying bodies. The detection and tracking device can be positioned either directly on the aerial vehicle or on the ground. The disruption device and the detection and tracking device can be in communication with one another.

The disruption device can further be adapted to receive control signals from the first transmitting unit. Where the control signals are present, the disruption device, based on a comparison of the control signals with disruption signals to be generated by the disruption device, can be adapted to disrupt the first radio path between the first receiving unit and the first transmitting unit provided for controlling the flight path of the unmanned flying body. The disruption device can thus be used for "reactive disruption."

This has the advantage that the flying object can be disrupted more effectively. This means that (a) the required transmitting power at a given range of the disruption device is reduced, or (b) at a given transmitting power, the achieved range is increased. The described effects (a) and (b) are equivalent. In addition, the influence on other users of the frequency spectrum is further reduced. This effect occurs together with effect (a) or (b).

The disruption device can be adapted to be operated at the start of a take-off operation. The disruption device can be adapted to be operated at the start of a landing operation of the aerial vehicle. The take-off operation can be initiated manually by a pilot of the aerial vehicle. The landing operation can be initiated manually by a pilot of the aerial vehicle. The take-off operation can be initiated automatically. The landing operation can also be initiated automatically. The take-off operation and the landing operation can be interrupted manually by the pilot or automatically.

The disruption device can be adapted to be operated during the take-off operation of the aerial vehicle until the end of the take-off operation is initiated manually by the pilot of the aerial vehicle or automatically. The disruption device can be adapted to be operated during the landing operation of the aerial vehicle until the end of the landing operation is initiated manually by the pilot of the aerial vehicle or automatically.

This has the advantage of reducing the power consumption required for the disruption device.

The take-off operation and/or the landing operation can be associated with an opening/closing of the landing flaps, with a pressure level of front tires of the aerial vehicle, with a control command entered by a pilot of the aerial vehicle, and/or with a thrust profile of the aerial vehicle.

This has the advantage of operating the disruption device in good time, in order to be able to avert dangers beforehand.

The disruption device can be adapted to disrupt the first radio path in a region in front of the aerial vehicle, based on a frequency band that is the same as a frequency band used by the first transmitting unit.

The disruption device can be adapted to disrupt the plurality of second radio paths in a region in front of the aerial vehicle, based on a frequency band that is the same as a frequency band used by the plurality of second transmitting units.

This has the advantage of providing a disruption system which is matched to the frequencies in question and with which other frequency bands which are used are not disrupted.

The disruption device can further be adapted to disrupt the plurality of second radio paths using a wide-band frequency range. The wide-band frequency range can comprise a first and a second frequency band. The first frequency band can be a frequency band that is freely available to the public. The first frequency band can be adapted for a conventional use of a drone. The second frequency band can be a frequency band of a navigation satellite system, in particular for a navigation system provided in a particular region. The term "wide-band" can be understood as meaning that more than a single frequency band is used. The first frequency band can be the frequency band used by the first transmitting unit. The second frequency band can be a frequency band used by one of the plurality of second transmitting units. The first and second frequency bands can be frequency ranges which lie outside one or more frequency ranges that are used for aerial vehicle signaling and communication with the aerial vehicle.

Both automatic and manual flying maneuvers of the flying object can hereby be prevented.

The first and second frequency bands can be separate in terms of frequency.

With wide-band disruption, frequency bands which are currently not being used and which will play a role in the future can also be covered. Furthermore, with separation in terms of frequency, the energy supplied by a power supply unit can purposively be distributed to the two frequency bands.

The disruption device can be adapted to perform the disruption in the vicinity of the airport. The disruption can be performed in a take-off region or landing region. The disruption can further be performed in an airspace of the airport. "In the vicinity" can be understood as meaning the allotted airspace or an area delimited by the airport. The disruption device can be adapted to perform the disruption beyond the delimited area.

The disruption device can be adapted to perform the disruption in an operation area. "In an operation area" can be understood as meaning, for example, a forest fire area, an area around a major event, a portion of the flight route, and/or the entire flight route. The operation area can also be referred to as the operation region. The disruption device can further be adapted to be operated during a cruising flight.

According to a second aspect, an aerial vehicle comprising a disruption device according to the first aspect is provided.

The disruption device can be mounted on a front region of a shell of the aerial vehicle. The disruption device can be mounted in or on a radome of the aerial vehicle or a nose of the aerial vehicle, in particular an airplane nose, in order to disrupt the radio path in a region in front of the aerial vehicle during take-off and/or landing.

The disruption device can be mounted on a front or bottom region of a shell of the aerial vehicle, in particular in or on a radome of the aerial vehicle or a nose of the aerial vehicle. The disruption device can be adapted to disrupt the radio path in a region in front of and beneath the aerial vehicle during a flight. One or more further disruption devices can also be mounted in the upper and/or rear region of a shell of the aerial vehicle, in order to disrupt the radio path in a region above and behind the aerial vehicle during a flight.

An aerial vehicle equipped with a disruption device according to the first aspect has the advantage that it is not dependent on other ground-based disruption devices.

It is clear to the person skilled in the art that the explanations presented herein are/can be implemented using hardware circuits, software means or a combination thereof. The software means can be associated with programmed microprocessors or a computer in general, an ASIC (application specific integrated circuit) and/or DSPs (digital signal processors). The disruption device can comprise, for example, at least one transmitting unit for transmitting electromagnetic waves intended to cause disruption. The disruption device can further comprise at least one processing unit. Other circuit-related devices and structural elements as well as high-frequency structural elements may also be part of the disruption device. For example, the at least one processing unit can be implemented in part as a computer, a logic circuit, an FPGA (field programmable gate array), a processor (for example a microprocessor, a microcontroller (µC) or a vector processor)/core (can be integrated in the processor or used by the processor)/CPU (central processing unit; a plurality of processor cores is possible), an FPU (floating point unit), an NPU (numeric processing unit), an ALU (arithmetic logical unit), a coprocessor (additional microprocessor for assisting a main processor (CPU)), a GPGPU (general purpose computation on graphics processing unit), a parallel computer (for simultaneously performing computing operations, inter alia on a plurality of main processors and/or graphics processors) or a DSP.

Although some of the aspects described above have been described in relation to the disruption device, these aspects may also apply to the aerial vehicle. Likewise, the aspects described above in relation to the aerial vehicle may correspondingly apply to the disruption device.

BRIEF DESCRIPTION OF THE DRAWINGS

Further objects, features, advantages and possible applications will become apparent from the following description of exemplary embodiments, which are not to be interpreted as being limiting, with reference to the accompanying drawings. In the drawings, all the features which are described and/or depicted show the subject-matter disclosed herein on their own or in any desired combination, also independently of their grouping in the claims or their references. The dimensions and proportions of the components shown in the figures are not necessarily to scale; they can differ from those shown in embodiments for implementation.

DETAILED DESCRIPTION OF THE PREFERRED EMBODIMENTS

Figure 1:
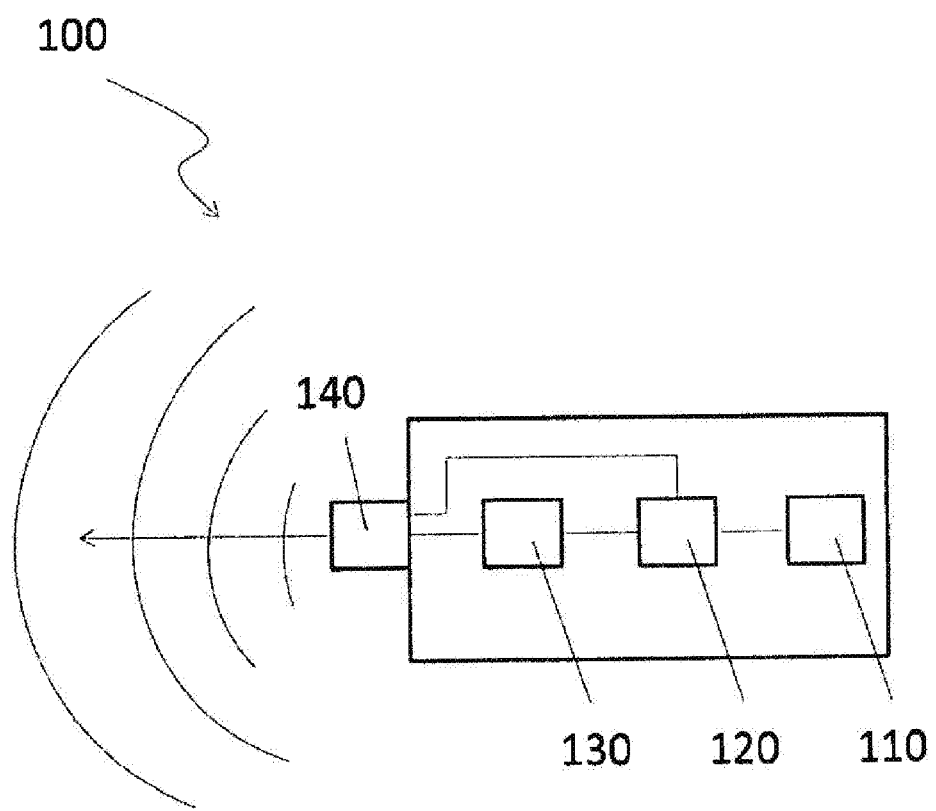
FIG. 1 is a schematic representation of a disruption device.

The method variants/device variants described herein of the and their, functional and operational aspects serve merely for better understanding of their structure, functioning and properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described devices. Combinations between all the individual implementations in the text, that is to say, in every section of the description, in the claims, and also combinations between different variants in the text, in the claims and in the figures, are also included and can form the subject-matter of further claims. The claims also do not limit the disclosure and thus the possible combinations of all the indicated features with one another. All the disclosed features are explicitly also disclosed herein individually and in combination with all the other features.

In the figures, components which correspond to one another or are functionally similar are provided with the same reference numerals. The disruption device according to the invention and the aerial vehicle according to the invention will now be described with reference to exemplary embodiments.

In the following, specific details are described, without implying any limitation, in order to give a complete understanding of the present disclosure. It is, however, clear to a person skilled in the art that the present disclosure can be used in other exemplary embodiments which may differ from the details described below.

FIG. 1 is a schematic representation of a disruption device 100. The disruption device 100 comprises a power supply unit 110, a signal processing unit 120, an amplifying unit 130 and an antenna/antenna group 140. The power supply unit 110 is adapted to supply a current required for the signal processing unit 120 and for the amplifying unit 130. The signal processing unit 120 is adapted to generate wide-band signals for a first and/or second frequency range which is/are used by an unmanned flying body. Furthermore, the signal processing unit 120 can also be adapted to receive signals. The received signals can be processed by the signal processing unit 120. Processing can comprise correlating the received signals with the disruption signals to be generated. Based on a result of the correlation, the signal processing unit can be adapted to generate a disruption signal to be transmitted. Reactive disruption and/or protocol-based disruption can hereby be achieved. The amplifying unit 130 is adapted to amplify the signal provided by the signal generation and forward it to the antenna/antenna group 140. The antenna/antenna group 140 is adapted to transmit/transform the forwarded signal into a free space. This is shown schematically by means of wave fronts. The disruption device 100 is adapted, on the one hand, to disrupt and/or overlay radio signals coming from a remote control and directed to an unmanned flying body. On the other hand, the disruption device 100 is adapted to disrupt signals coming from global navigation satellite systems, GNSS, which the unmanned flying body can use for flight path control. The disruption device 100 is thereby able, on the one hand, to generate a sufficiently large signal that the signals provided by the radio control or by one or more GNSS satellites are overlaid and thus cannot be discovered beneath the signal supplied by the disruption device 100. The disruption device 100 can further be in the form of a spoofer, so as to generate disruption signals which are similar to the signals supplied by the GNSS satellites, in order to divert the unmanned flying body in such a manner that the unmanned flying body is unable to fly or is prevented from flying into an airspace of the aerial vehicle. The disruption device 100 can be so adapted that it can be controlled/can be operated manually or by automatically switching on/off. The disruption device 100 can here be so designed, for example, that it switches on when the aerial device is taking off/landing. During the take-off and landing operation of the aerial vehicle, the disruption device 100 can be adapted to be operated. For example, the disruption device 100 can be operated up to a specific altitude, at which the disruption device 100 switches off automatically. If the aerial vehicle falls below a specific altitude, the disruption device 100 can be configured to switch on automatically.

Figure 2:
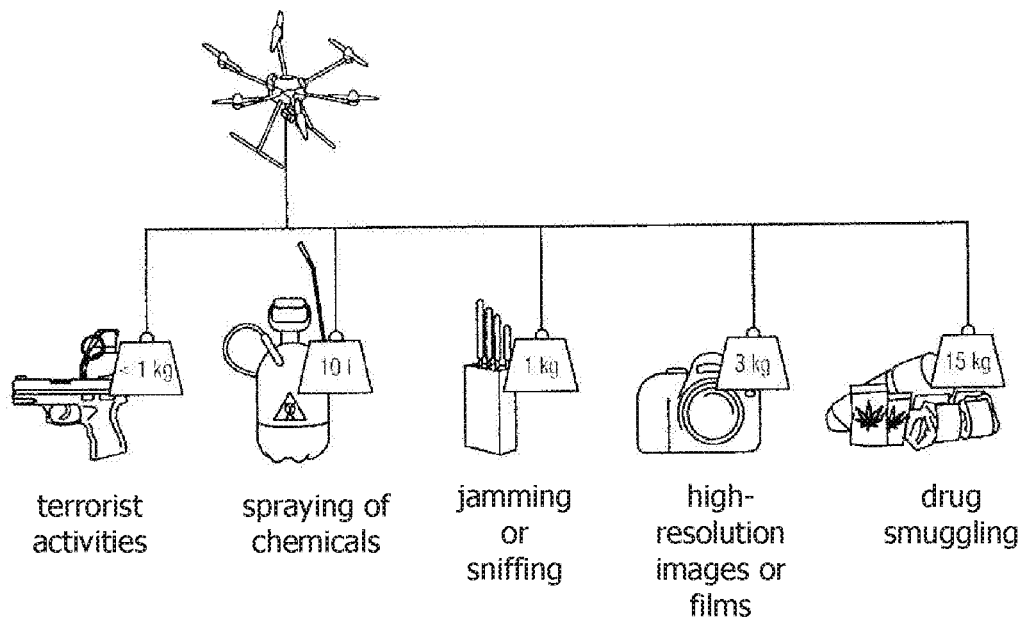
FIG. 2 is a schematic representation of an unmanned flying body with loads arranged thereon.

FIG. 2 is a schematic representation of an unmanned flying body with loads arranged thereon. The unmanned flying body can be a drone. The drone may be equipped with weapons for terrorist activities, such as shells or guns, with a weight of less than 1 kg. The drone may further be equipped with chemicals (up to 10 liters), which can be used for distribution/spraying thereof. The drone may further be equipped with jammers or sniffing tools (up to 1 kg), in order to defend itself against ground-based disruption devices. The drone may further be equipped with high-resolution image or video cameras (up to 3 kg) for taking pictures of the ground. The drone may further be used for smuggling drugs (up to 15 kg). The disruption device 100 of FIG. 1 can be used effectively against such drones. The drone of FIG. 2 can thereby be so influenced and disrupted by the disruption device of FIG. 1 that it flies back to its starting point, falls to the ground, remains in position or drops to the ground. If the drone is equipped with RCIED (radio controlled improvised explosive device), the disruption device can be adapted to interrupt/disrupt a radio connection to the RCIED. A terrorist attack can thus be prevented. If the drone is equipped with GNSS receivers and position-determining units connected thereto, the disruption device of FIG. 1 can be used to prevent the drone from flying automatically and thereby control the flight path in such a manner that a path specified by the disruption device of FIG. 1 is flown or the flight path originally programmed is prevented. An automatic flight of a drone based on a GNSS signal can thus be disrupted effectively by a disruption device of FIG. 1.

Figure 3:
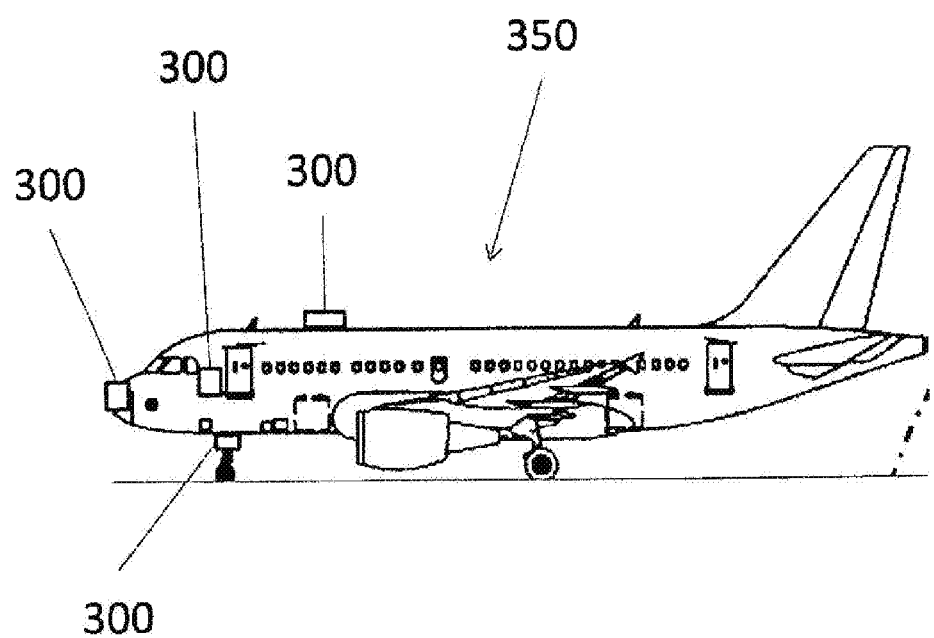
FIG. 3 is a schematic representation of an aerial vehicle having the disruption device.

FIG. 3 is a schematic representation of an aerial vehicle 350 having a disruption device 300. The aerial vehicle 350 is here shown as an airplane 350, the airplane 350 being equipped with a disruption device 300. The disruption device 300 is so arranged on the airplane 350 that a region in front of the airplane 350 is illuminated. For example, the disruption device 300 can be mounted on a nose of the airplane 350, laterally on an airplane door of the airplane 350, on the airplane 350 or in the vicinity of a wheel well of the airplane 350. "Illuminated" is here understood as meaning the transmission of an electromagnetic wave in the direction in front of the airplane 350. The region in front of the airplane 350 corresponds to the usual flying direction of the airplane 350. A directional antenna can therefore be used in order to increase a gain of the antenna and thus increase the power in that region. The disruption device 300 can accordingly transmit more power into the region in front of the airplane 350 or save energy in terms of the power supply, see FIG. 1. When the airplane is taking off or landing, the disruption device 300, as described in FIG. 1, can be implemented. During the take-off and landing operation, drones, as shown in FIG. 2, are thus prevented from entering a flying range of the aerial vehicle 350. The airplane 350 is thus prevented from colliding with the drone. The disruption device 300 can be so adapted that, as is shown in FIG. 1, it works in two or more frequency ranges, where one or more frequency range(s) serve/serves for radio control and the other frequency range serves to receive GNSS signals. The disruption device 300 can additionally comprise both or all frequency ranges in a wide-band manner. The disruption device 300 can further be so adapted that electromagnetic signals with two or more different frequency ranges are transmitted, which frequency ranges correspond, on the one hand, to the GNSS frequency range and, on the other hand, to the radio frequency range. These frequency bands are separate from one another in terms of frequency. If a user on the ground is controlling his drone with a remote control in the vicinity of a flight path of the airplane 350, the disruption device 300 is able to disrupt the radio connection of the remote control to the drone and prevent this plan. If the drone has been provided by the user with a program code so that the drone independently follows a predetermined flight path with the aid of GNSS signals, and if the drone crosses a flight path of the airplane 350, the disruption device 300 is able to disrupt a radio path between a receiver of the drone and the GNSS satellites, in particular the GNSS signals, so that the drone, based on the disruption signal, follows a different flight path. The disruption device 300 can further be adapted to transmit GNSS signals in order to send an incorrect target to the drone. The drone can thus be guided by the disruption device 300. The disruption device 300 can further be adapted to transmit remote control signals in order to control the drone with the disruption device 300.

Figure 4:
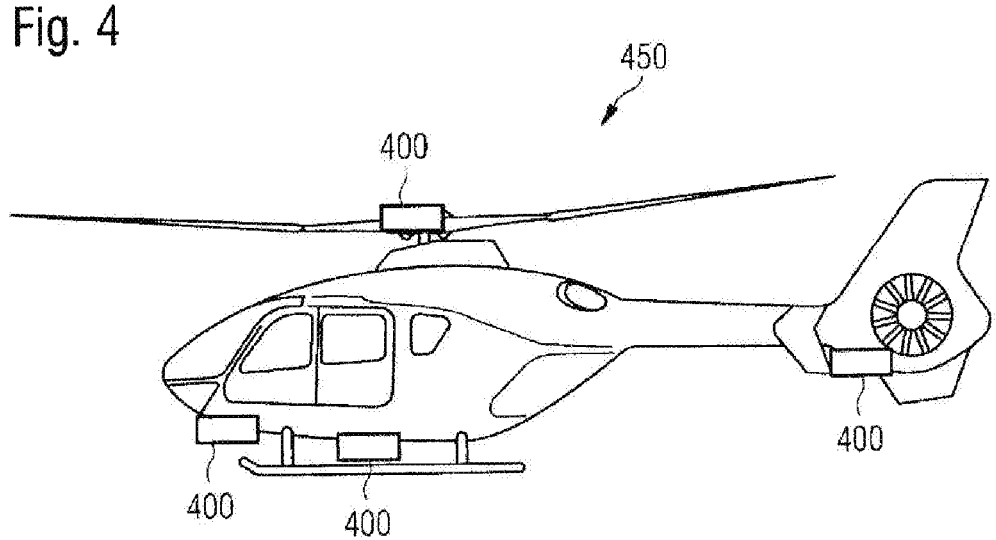
FIG. 4 is a schematic representation of an aerial vehicle having the disruption device.

FIG. 4 is a schematic representation of an aerial vehicle 450 having one or more disruption device(s) 400. The aerial vehicle 450 is here shown as a helicopter 450, the helicopter 450 being equipped with one or more disruption device(s) 400. The disruption device(s) 400 is/are so arranged on the helicopter 450 that a region in front of the helicopter 450 or around the helicopter 450 is illuminated. For example, the disruption device 400 can be mounted on a nose of the helicopter 450, underneath on or between the skids/wheels of the helicopter 450, on the helicopter 450 or underneath in the vicinity of the rear rotor of the helicopter 450. "Illuminated" is here understood as meaning the transmission of an electromagnetic wave in the direction in front of the helicopter 450, or "all-round directional characteristics" around the helicopter 450. When the helicopter is in an at-risk area, the disruption device 400, as described in FIG. 1, can be implemented. During use, drones, as shown in FIG. 2, are thus prevented from entering a flying range in front of or around the aerial vehicle 450. The helicopter 450 is thus prevented from colliding with the drone. The disruption device 400 can be so adapted that, as is shown in FIG. 1, it works in two or more frequency ranges, where one or more frequency range(s) serve/serves for radio control and the other frequency range serves to receive GNSS signals. The disruption device 400 can additionally comprise both or all frequency ranges in a wide-band manner. The disruption device 400 can further be so adapted that electromagnetic signals with two or more different frequency ranges are transmitted, which frequency ranges correspond, on the one hand, to the GNSS frequency range and, on the other hand, to the radio frequency range. These frequency bands are separate from one another in terms of frequency. If a user on the ground is controlling his drone with a remote control in the vicinity of a flight path of the helicopter 450, the disruption device 400 is able to disrupt the radio connection of the remote control to the drone and prevent this plan. If the drone has been provided by the user with a program code so that the drone independently follows a predetermined flight path with the aid of GNSS signals, and if the drone crosses a flight path of the helicopter 450, the disruption device 400 is able to disrupt a radio path between a receiver of the drone and the GNSS satellites, in particular the GNSS signals, so that the drone, based on the disruption signal, follows a different flight path. The disruption device 400 can further be adapted to transmit incorrect GNSS signals. An incorrect target can thus be sent to the drone. The drone can thus be guided by the disruption device 400. The disruption device 400 can further be adapted to transmit remote control signals in order to control the drone with the disruption device 400.

The invention is naturally not limited in any way to the embodiments described above. On the contrary, many possibilities for modifications thereof will be apparent to an average person skilled in the art, without deviating from the underlying idea of the invention, as is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A disruption device for fixing to an aerial vehicle, the disruption device comprising:
    a directional antenna, and,
    an amplifier for amplifying a signal provided to the directional antenna,
    wherein the disruption device is adapted to disrupt at least one radio path between at least one receiving unit of each unmanned flying body receiving a signal from the directional antenna and at least one transmitting unit provided for controlling the flight path of the unmanned flying body,
    wherein the disruption device is adapted to switch on at a start of a take-off operation or a landing operation of the aerial vehicle, and
    wherein the take-off operation or the landing operation is initiated manually by a pilot of the aerial vehicle or automatically.

2. The disruption device according to claim 1, wherein the disruption device is adapted to be operated during at least one of a take-off operation or a landing operation of the aerial vehicle, until an end of the at least one of the take-off operation or the landing operation is initiated at least one of manually by a pilot of the aerial vehicle or automatically.

3. The disruption device according to claim 1, wherein at least one of a take-off operation or a landing operation is associated with at least one of
    an opening or closing of landing flaps of the aerial vehicle,
    a pressure level of front tires of the aerial vehicle,
    a control command entered by a pilot of the aerial vehicle, or
    a thrust profile of the aerial vehicle.

4. The disruption device according to claim 1, wherein the disruption device is adapted to perform the disruption in at least one of
    a vicinity of the airport,
    a take-off region of the airport,
    a landing region of the airport, or
    an airspace of the airport.

5. The disruption device according to claim 1, wherein
    the at least one radio path comprises a first radio path,
    the at least one receiving unit of each unmanned flying body comprises a first receiving unit, and
    the at least one transmitting unit comprises a first transmitting unit; and
    the device is adapted to disrupt the first radio path between the first receiving unit and the first transmitting unit provided for controlling the flight path of each unmanned flying body.

6. The disruption device according to claim 5, wherein the first transmitting unit is a remote control, and wherein the first radio path is a wireless connection between the remote control and the first receiving unit.

7. The disruption device according to claim 1, wherein
    the at least one radio path comprises a plurality of second radio paths, and
    the at least one receiving unit of each unmanned flying body comprises a second receiving unit, and
    the at least one transmitting unit comprises a plurality of second transmitting units; and
    the device is adapted to disrupt the plurality of radio paths between the second receiving unit and the plurality of second transmitting units provided for controlling the flight path of each unmanned flying body.

8. The disruption device according to claim 7, wherein the plurality of second transmitting units are global navigation satellite system, GNSS, transmitters, and wherein the second receiving unit is a GNSS receiver, and wherein the plurality of second radio paths are wireless connections between the GNSS transmitters and the GNSS receiver.

9. The disruption device according to claim 7, wherein the disruption device is adapted to disrupt at least one of the first radio path or the plurality of second radio paths in a region in front of the aerial vehicle, based on a frequency band that is the same as a frequency band used by the at least one of the first transmitting unit or the plurality of second transmitting units.

10. The disruption device according to claim 7, wherein the disruption device is further adapted to disrupt the plurality of second radio paths using a wide-band frequency range, and wherein the wide-band frequency range comprises a first and a second frequency band, and wherein the first frequency band is the frequency band used by the first transmitting unit and the second frequency band is a frequency band used by the plurality of second transmitting units.

11. The disruption device according to claim 10, wherein the first and second frequency bands are separate in terms of frequency.

12. An aerial vehicle comprising the disruption device according to claim 1.

13. The aerial vehicle according to claim 12, wherein the disruption device is mounted on at least one of
    a front region of a shell of the aerial vehicle,
    in or on a radome of the aerial vehicle,
    a nose of the aerial vehicle, and
    wherein the disruption device is adapted to disrupt the radio path in a region in front of the aerial vehicle during at least one of a take-off or a landing of the aerial vehicle.

14. The aerial vehicle according to claim 12, wherein the disruption device is mounted on at least one of
    a front region of a shell of the aerial vehicle,
    bottom region of a shell of the aerial vehicle,
    in or on a radome of the aerial vehicle, or
    a nose of the aerial vehicle, and
    wherein the disruption device is adapted to disrupt the radio path in a region in front of and beneath the aerial vehicle during a flight of the aerial vehicle.

15. A disruption device for fixing to an aerial vehicle, the disruption device comprising:
    a directional antenna, and,
    an amplifier for amplifying a signal provided to the directional antenna,
    wherein the disruption device is adapted to disrupt at least one radio path between at least one receiving unit of each unmanned flying body receiving a signal from the directional antenna and at least wherein the disruption device is adapted to switch on at a start of a take-off operation or a landing operation of the aerial vehicle, and wherein the take-off operation or the landing operation is associated with at least one of:

an opening or closing of landing flaps of the aerial vehicle, a pressure level of front tires of the aerial vehicle, an altitude of the aerial vehicle, or a thrust profile of the aerial vehicle.

\* \* \* \* \*